United States Patent
Mariella et al.

(10) Patent No.: US 12,025,184 B2
(45) Date of Patent: Jul. 2, 2024

(54) SEALING DEVICE MADE OF PLASTICS MATERIAL FOR A BEARING UNIT

(71) Applicant: AKTIEBOLAGET SKF, Gothenburg (SE)

(72) Inventors: Donato Mariella, Turin (IT); Riccardo Restivo, Turin (IT); Giorgia D'Amico, Turin (IT); Claudio Foti, Villanova d'asti (IT)

(73) Assignee: AKTIEBOLAGET SKF (SE)

( * ) Notice: Subject to any disclaimer, the term of this patent is extended or adjusted under 35 U.S.C. 154(b) by 14 days.

(21) Appl. No.: 17/735,698

(22) Filed: May 3, 2022

(65) Prior Publication Data
US 2022/0349445 A1  Nov. 3, 2022

(30) Foreign Application Priority Data

May 3, 2021 (IT) .................... 102021000011102

(51) Int. Cl.
*F16C 33/78* (2006.01)
*F16C 33/80* (2006.01)

(52) U.S. Cl.
CPC ........ *F16C 33/783* (2013.01); *F16C 33/7853* (2013.01); *F16C 33/80* (2013.01); *F16C 2208/70* (2013.01)

(58) Field of Classification Search
CPC ............... F16C 33/7823; F16C 33/783; F16C 33/7853; F16C 33/7856; F16C 33/80; F16C 33/805
See application file for complete search history.

(56) References Cited

U.S. PATENT DOCUMENTS

| 2,887,330 | A | 5/1959 | Cobb |
| 3,556,539 | A | 1/1971 | Senigalliesi |
| 6,334,615 | B1 | 1/2002 | Uchiyama et al. |
| 6,692,393 | B2 | 2/2004 | Fukuwaka et al. |

FOREIGN PATENT DOCUMENTS

| DE | 1169214 | | 4/1964 |
| DE | 1625522 | | 7/1970 |
| JP | H0635663 U | * | 5/1994 |
| JP | H0645120 U | * | 6/1994 |
| JP | 2002031146 | | 1/2002 |
| JP | 2006125482 | | 5/2006 |
| KR | 20170045661 A | * | 4/2017 |

OTHER PUBLICATIONS

Machine Translation of JP-H0635663-U (Year: 1994).*
Search Report for corresponding Italy Patent Application No. 202100011102 dated Dec. 21, 2021.

* cited by examiner

*Primary Examiner* — Alan B Waits
(74) *Attorney, Agent, or Firm* — Reed Smith LLP

(57) ABSTRACT

A sealing device for a bearing unit that includes an inner ring, an outer ring, a plurality of rolling bodies interposed between the inner ring and the outer ring, the sealing device having a radially outer anchoring portion, an intermediate portion, and a radially inner sealing portion distal to the radially outer anchoring portion, the sealing device being made of a single polymer plastic material.

13 Claims, 5 Drawing Sheets

SEALING DEVICE MADE OF PLASTICS MATERIAL FOR A BEARING UNIT

CROSS REFERENCE TO RELATED APPLICATIONS

This application is based on and claims priority to Italian Patent Application No. 102021000011102 filed on May 3, 2021, under 35 U.S.C. § 119, the disclosure of which is incorporated by reference herein.

FIELD

The present disclosure relates to sealing devices for bearing units.

BACKGROUND

In bearing units, sealing devices may be used to keep contaminants out of the bearing unit.

BRIEF DESCRIPTION OF THE DRAWINGS

The disclosure will now be described with reference to the appended drawings illustrating various non-limiting exemplary embodiments by way of example, in which.

DETAILED DESCRIPTION

Figure 1:
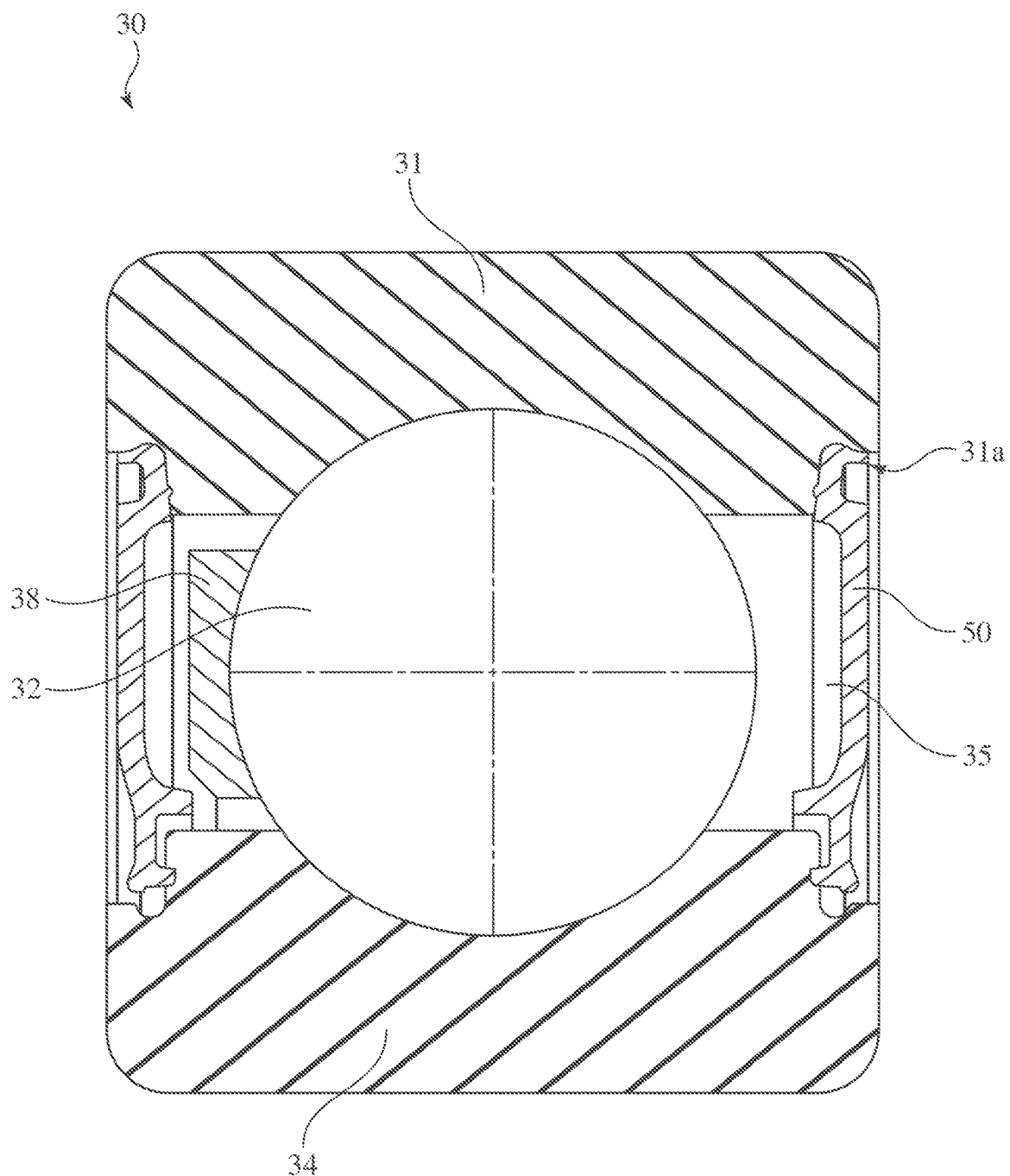
FIG. 1 is a diagrammatical illustration of a bearing unit provided with a sealing device, shown in a deformed state, according to exemplary embodiments of the present disclosure.

According to known techniques, a sealing device for a bearing unit of a wheel hub may be made of one piece. This configuration is used both for stationary outer rings and rotating inner rings, and for rotating outer rings and stationary inner rings. What is important is that the stationary ring be provided with a housing groove. This is the case, for example, with ball bearing units (e.g., DGBBs).

Known sealing devices may include a metal shield onto which an elastomer portion is co-moulded. The elastomer portion is provided with a radially outer lip which is secured to the housing groove of the stationary ring of the bearing unit by an interference fit, for example, with the radially outer ring. Being thus integral with the outer ring, the radially outer lip of the elastomer portion provides a seal through that component because of the interference fit. The elastomer portion is also provided with at least one radially inner lip.

Preferably, this lip may be of the contacting type and in this way makes sliding contact with the rotating ring of the bearing unit, for example, the radially inner ring, making a seal against the latter.

Alternatively, the lip may be non-contacting with regards to the rotating ring. In this case, the lip forms a "labyrinth". Such labyrinths may be used for both a radially outer rotating ring and a radially inner rotating ring. A rotating outer ring is however more effective, as the centrifugal force associated with the angular velocity of the rotating ring tends to repel contaminants towards an outside of the bearing unit.

Known sealing devices thus may include one or more protrusions called lips that, having different shapes and orientations (typically axial and radial), are in contact with the surfaces of the rotating bearing unit. In this way, the sealing device prevents contaminants from entering from the outside, protecting internal components of the bearing unit, e.g., rolling elements, cages, etc.

Another important function of a sealing device is to prevent lubricants from escaping from inside the bearing unit. Bearing units that are lubricated for their entire service life should be shielded or sealed. In the case of sealing devices, there are many solutions depending on the level of performance to be achieved. In every case, the sealing device is manufactured from metal and vulcanized rubber. This entails a complex and expensive process. It also requires much energy and the use of many chemicals. Furthermore, known seals cannot be recycled because a seal with vulcanized rubber bonded to metal cannot be recycled.

Thus technical problems with known sealing devices include cost of production and processing, and end-of-life impact.

With regard to cost of production and processing problems, it must be borne in mind that the metal insert may be degreased, for example by washing in a hot water ultrasound bath (to remove any residual oil and dirt), phosphatized, and rendered adhering, for example by treating the material with a corundum shot peening machine to improve adhesion of the primer. This brings about complete bonding between the rubber compound and the metal core at the moulding stage.

A vulcanization process may take place in a compression mould, which is left closed for about 1-3 minutes and then opened. This process is very complex and may fail to yield satisfactory results due to imperfect filling of the mould and formation of burrs on finished material. Obtaining a fluid seal by this known process that is static requires an over-engineered and expensive process.

A known solution is to make the sealing device from fiber-glass reinforced polyamide by means of a machining and/or extrusion process and then co-moulding with thermoplastic polyurethane (TPU). However this solution only works well for static sealing requirements or very low contact speeds (approx. 2-3 m/s max). In the case of dynamic seals at higher speeds, the seal will warp and the polyurethane will wear easily due to sliding contact with the radially inner ring.

There is therefore a need for a sealing device that overcomes the above-mentioned drawbacks, while ensuring a constantly reliable seal.

An object of the present disclosure is to provide a sealing device made of a single polymer material by an injection moulding process, while reducing costs and environmental impact and maintaining comparable sealing performance to known solutions.

The present disclosure relates to a sealing device for a bearing unit, and a bearing unit provided with a sealing device. The sealing device and the bearing unit may apply to all industrial applications, and in particular to those applications where a stationary ring of the bearing unit is provided with a suitable groove for anchoring the sealing device.

The disclosure may be suitable for any type of rolling elements (balls, rollers, tapered rollers, etc.), and in particular to bearing units using a plurality of balls as rolling elements, referred to as Deep Groove Ball Bearings (DGBBs).

Purely by way of non-limiting examples, the present disclosure will now be described with reference to a bearing unit 30 having a sealing device according to the present disclosure. Throughout this disclosure, terms and expressions indicating positions and orientations such as "radial" and "axial" are to be understood to refer to a central axis of rotation X of a bearing unit 30. Expressions such as "axially outer" and "axially inner" refer to a fitted condition of a sealing device in a bearing unit, and may be to a side on which the sealing device is inserted into a housing groove of a radially outer ring and, respectively, to a side opposite a side of insertion.

Reference will be made to exemplary embodiments of a bearing unit having a rotating radially inner ring and a stationary radially outer ring with a groove for housing a sealing device. It should be appreciated that in other embodiments, a bearing unit may have a rotating radially outer ring and a stationary radially inner ring provided with a groove for housing the sealing device.

With reference to FIG. 1, various embodiments of a bearing unit 30 having a central axis of rotation X may include a stationary radially outer ring 31 with a radially inner groove 31*a*, a rotating radially inner ring 34, a plurality of rolling bodies 32, e.g., balls or rollers, located between inner ring 34 and outer ring 31, and at least one cage 38.

Radially outer ring 31 and radially inner ring 34 may define a gap 35 which, if unshielded, may allow contaminants and impurities to enter bearing unit 30.

Therefore, in order to shield a bearing unit 30, at least one sealing device 50 may be fitted within gap 35.

FIG. 1, illustrates a sealing device 50 in a deformed state that may be fitted in a housing groove 31*a* of a radially outer ring 31.

Figure 2:
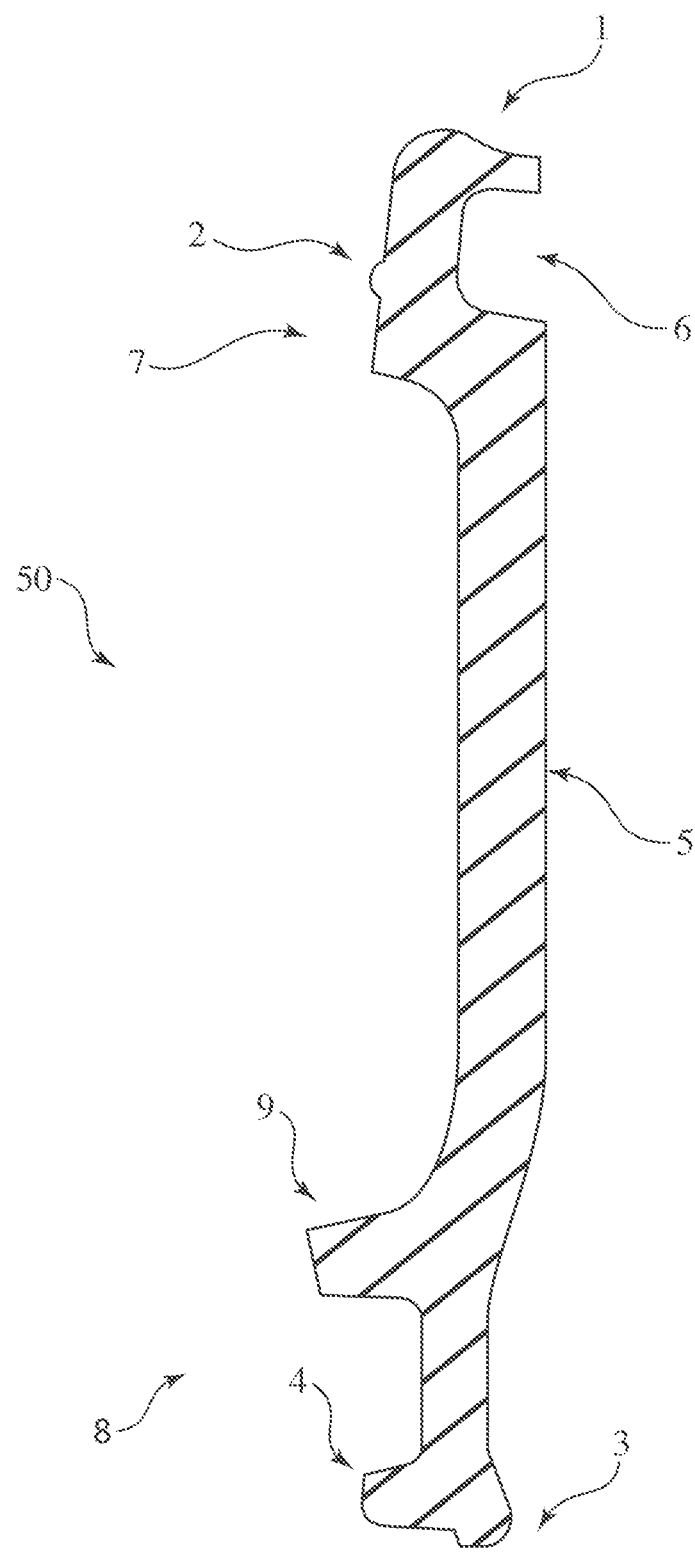
FIG. 2 shows the sealing device in FIG. 1 in an undeformed configuration according to exemplary embodiments of the present disclosure.

FIG. 2 shows various embodiments of a sealing device 50 in an undeformed state. In various embodiments, a sealing device 50 may be made of a single piece of a single polymer material through an injection moulding process. The single polymer material may be a blend of polybutylene terephthalate (PBT), which is a semi-crystalline thermoplastic material belonging to the polyester family, and may include friction modifying fillers and glass microsphere fillers to create a minimum level of structure in an amorphous material. This material minimizes wear on sliding contact and has good dimensional stability on account of the material being non-hygroscopic. This reduces up to 50% of process waste as material may be reused in the production process.

The PBT-based material has a modulus of elasticity, which together with the geometry of a sealing device in accordance with this disclosure, may ensure sufficient rigidity for correct assembly and positioning of the sealing device and sufficiently good sealing performance. Thus a sealing device according to the present disclosure may be based on a single polymer material that provides good mechanical strength and good sealing performance based on its properties and geometry. The PBT-based polymer also exists in a version compatible with food applications, with the same mechanical characteristics and production process.

In various embodiments, a sealing device 50 may include a radially outer anchoring portion 7, an intermediate stiffening portion 5, and a radially inner sealing portion 8. Outer anchoring portion 7 may be provided with an anchoring geometry 1 for inserting sealing device 50 in a radially inner groove 31*a* of a radially outer ring 31, at least one protuberance 2 that may function as an anti-rotational and static seal, and a flexible section 6 for mounting inside radially inner groove 31*a* of radially outer ring 31. Intermediate stiffening portion 5 may be dimensioned to provide a sealing device 50 with sufficient mechanical stiffness. Radially inner sealing portion 8 may include a first non-contacting lip 3 having a grease-retaining function, a contacting lip 4 providing a sealing function against a radially inner ring 34, and a second non-contacting lip 9.

Figure 3:
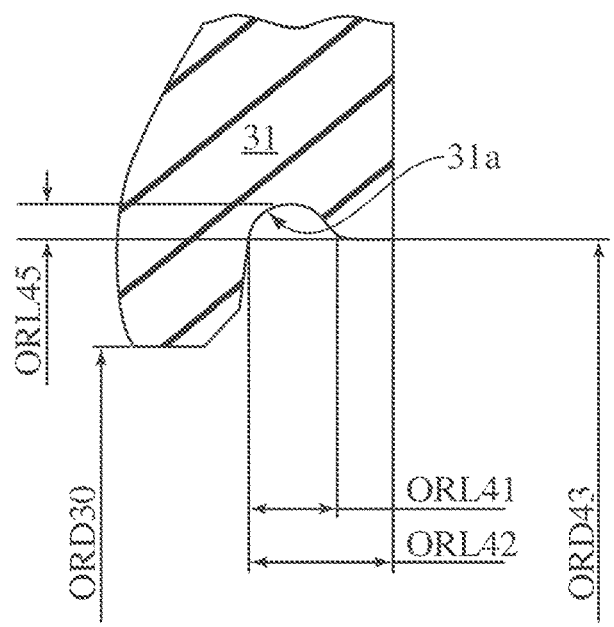
FIG. 3 is a detail view of a seat anchoring a radially outer ring of a bearing unit according to exemplary embodiments of the present disclosure.
Figure 4:
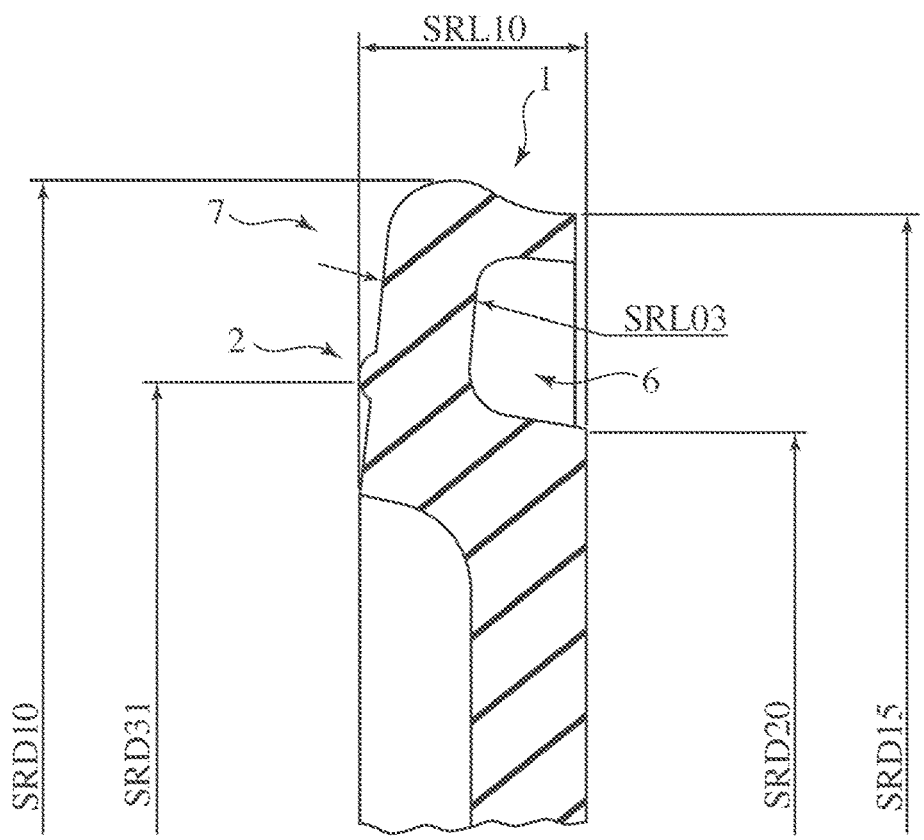
FIG. 4 is a detail view of an anchoring zone of the sealing device in FIG. 1 according to exemplary embodiments of the present disclosure.

FIGS. 3 and 4 illustrate various embodiments of an anchoring seat 31*a* of a radially outer ring 31 of a bearing unit 30 and an anchoring portion 7 of a sealing device 50, respectively.

In various embodiments, an anchoring geometry 1 for inserting a sealing device 50 inside a radially inner groove 31*a* of a radially outer ring 31 may be defined by a first radially outer diameter SRD15 that may be related to a radially inner diameter ORD43 of groove 31*a*.

In order to avoid rotation of the sealing device 50 in a seat of radially outer ring 31, a relationship between SRD15 and ORD43 may be:

$$ORD43+0.2 \text{ mm} < SRD15 < ORD43+0.5 \text{ mm}.$$

Anchoring geometry 1 may also be defined by a second radially outer diameter SRD10 that may be related to first radially outer diameter SRD15 of anchoring geometry 1. To prevent sealing device 50 from being flattened by a seat of radially outer ring 31, a relationship may be:

$$SRD15+0.3 \text{ mm} < SRD10 < SRD15+0.5 \text{ mm}.$$

In various embodiments, at least one protuberance 2 may be positioned according to a diameter SRD31 that is related to a radially inner diameter ORD30 of radially outer ring 31. To ensure precise positioning of the sealing device, a relationship may be:

$$ORD30+0.5 \text{ mm} < SRD31 < ORD30+0.8 \text{ mm}.$$

A flexible section 6 may be defined by two parameters: a radially inner diameter SRD20, which defines a start of a groove of flexible section 6, and a thickness SRL03. In order to allow flexibility when sealing device 50 is inserted into radially inner groove 31*a*, these parameters may be:

$$ORD30+0.2 \text{ mm} < SRD20 < ORD30+0.4 \text{ mm; and}$$
$$SRL03 \leq 0.5 \text{ mm},$$

where ORD30 may be equal to a radially inner diameter of radially outer ring 31.

An axial thickness SRL10 of anchoring portion 7 may not exceed 1.2 mm to prevent sealing device 50 from protruding from an axially inner line of radially outer ring 31, i.e. axially beyond an axial edge of radially outer ring 31.

Figure 5:
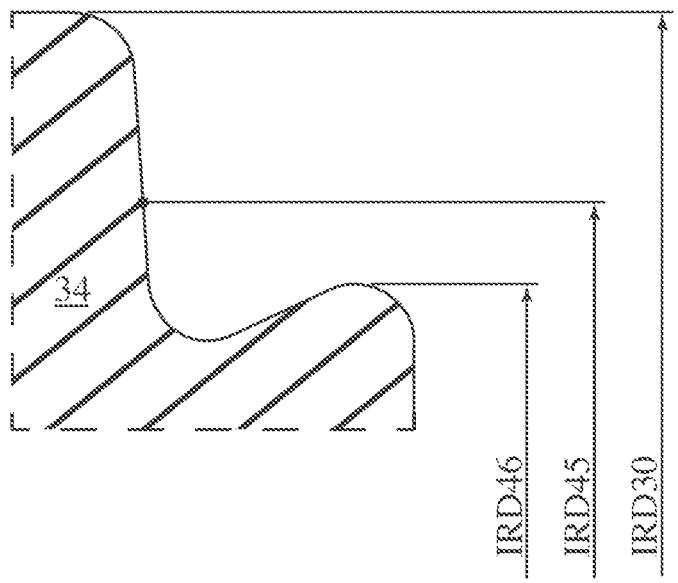
FIG. 5 is a detail view of a contact zone between a radially inner ring of the bearing unit and the sealing device in FIG. 1 according to exemplary embodiments of the present disclosure.
Figure 6:
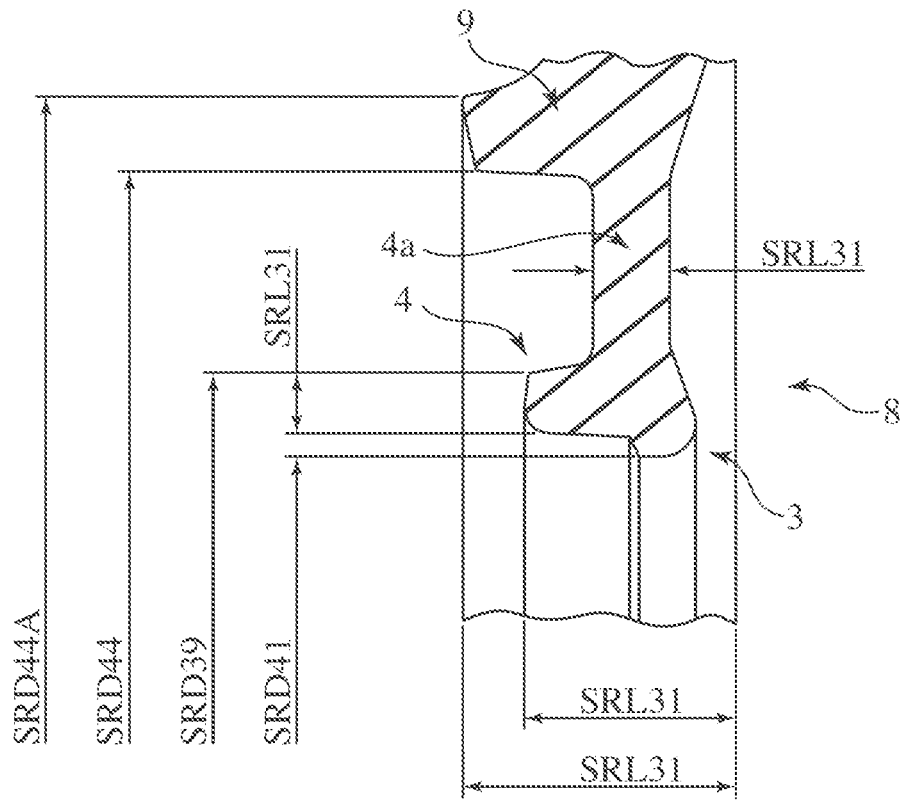
FIG. 6 is a detail view of a contact zone of the sealing device in FIG. 1 according to exemplary embodiments of the present disclosure.

FIGS. 5 and 6 illustrate various embodiments of a contact zone between a radially inner ring 34 of a bearing unit 30 and a contact zone of a radially inner sealing portion 8 of a sealing device 50, respectively.

A contacting lip 4 may have an axial thickness SRL31 at a web 4*a*. In various embodiments, SRL31 may be related to a flexibility and a contact pressure of contacting lip 4. In various embodiments, SRL31 may be between 0.2 mm and 0.6 mm. A radial thickness SRL39 of contacting lip 4 may have a sealing function against a radially inner ring 34. In various embodiments, SRL39 may be between 0.2 mm and 0.4 mm. A working diameter SRD39 of contacting lip 4 may be related to a corresponding working diameter IRD84 of radially inner ring 34, according to this relationship:

$$IRD84+0.2 \text{ mm} < SRD39 < IRD84+0.4 \text{ mm}.$$

An axial thickness SRL40 of contacting lip 4 may define a radial interference of contacting lip 4. In various embodiments, SRL40 may be between 0.8 mm and 1.5 mm.

A sealing portion 8 may include a first non-contacting lip 3 that may have a grease-retaining function and a second non-contacting lip 9. In order to ensure that there is no contact between radially inner ring 34 and first non-contacting lip 3, the following relationship may be applied:

$$IRD45+0.2 \text{ mm} < SRD41 < IRD45+0.4 \text{ mm}.$$

where IRD45 is a radially outer diameter of a seat of radially inner ring 34 and SRD41 is a radial thickness of non-contacting lip 3.

In order to ensure that there is no contact between radially inner ring 34 and second non-contacting lip 9, the following relationship may be applied:

$$IRD30+0.2 \text{ mm} < SRD44 < IRD84+0.4 \text{ mm}.$$

where IRD30 is a radially outer diameter of radially inner ring 34 and SRD44 is a diameter of non-contacting lip 9.

A radial dimension SRD44A and an axial dimension SRL44 of non-contacting lip 9 may determine an amount of lubricant, e.g., grease, recirculating in a sliding area of contacting lip 4 against radially inner ring 34. In particular, radial dimension SRD44A may be related to a diameter SRD44 such that:

$$SRD44+0.2 \text{ mm} < SRD44A < SRD44+0.6 \text{ mm}.$$

while axial dimension SRL44 may be between 1 mm and 2.5 mm.

Figure 7:
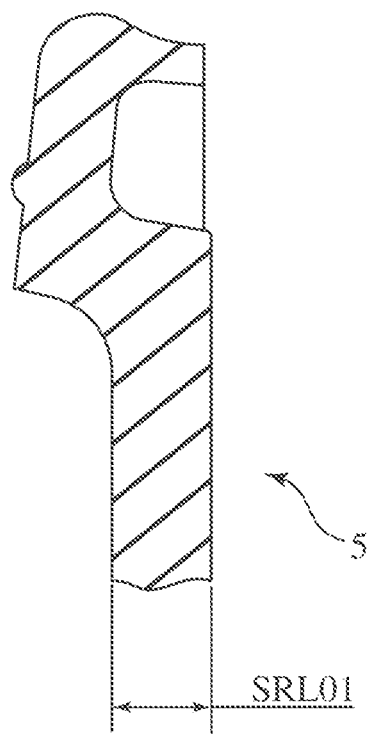
FIG. 7 is a detail view of a resistant zone of the sealing device in FIG. 1 according to exemplary embodiments of the present disclosure.

FIG. 7 illustrates various embodiments of an intermediate portion 5 of a sealing device 50. Intermediate portion 5 may be dimensioned to provide sufficient mechanical rigidity to sealing device 50 itself. In various embodiments, an axial thickness SRL01 of intermediate portion 5 may be between 0.5 mm and 0.9 mm.

Figure 8:
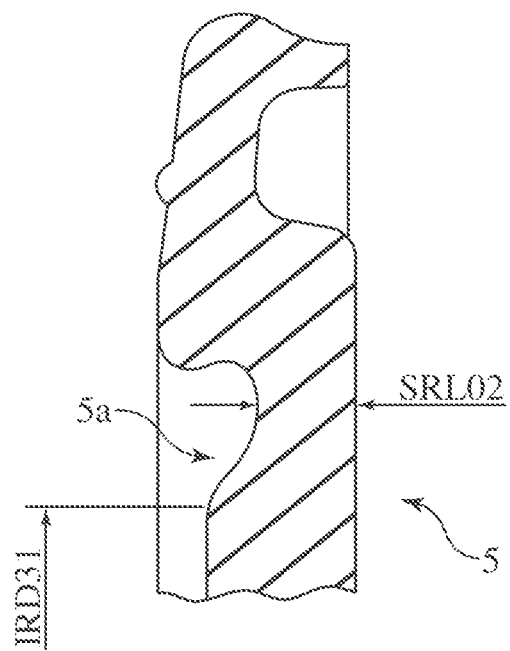
FIG. 8 is a detail view of a resistant zone of a sealing device having a relieving groove according to various embodiments of the present disclosure.

FIG. 8 illustrates various alternative embodiments of an intermediate portion 5 having a relieving groove 5a. Relieving groove 5a may ensure an increased distance between a sealing device 50 and at least one cage 38. An axial thickness SRL02 of a relieving groove 5a may be related to an axial thickness SRL01 of intermediate portion 5. In various embodiments, SRL02 may be defined by:

$$SRL01-0.5 \text{ mm} < SRL02 < SRL01-0.3 \text{ mm}.$$

In order to ensure a local increase in a distance between sealing device 50 and cage 38, a radial internal diameter SRD31 that is the diameter above which the relieving groove 5a originates may be related to an internal radial diameter ORD30 of a radially outer ring 31. In various embodiments, a relationship may be applied such that:

$$ORD30-1.5 \text{ mm} < SRD31 < ORD30-1 \text{ mm}.$$

Advantageously, a process for producing a sealing unit according to this disclosure is simpler than known processes for producing known sealing units and requires fewer components for production. The energy balance of an injection moulding production process favours compliance with current standards for moulding metal inserts and vulcanizing rubber, and is also environmentally friendly as no chemicals are required (phosphating, degreasing, gluing, etc.). Injection moulding can reuse up to 50% of waste and a resulting sealing unit is both up to 100% recyclable and easily separable from a bearing unit by known processes.

In addition to various embodiments of the disclosure as described herein, it must be understood that there are many variations. It should also be understood that these embodiments are only illustrative and do not limit either the scope of the disclosure, its applications, or its possible configurations. On the contrary, although the above description will allow a person skilled in the art to implement the present disclosure according to at least one embodiment thereof, it should be understood that many variations of the described components are possible without departing from the scope of the disclosure as defined in the appended claims, which are to be interpreted literally and/or according to their legal equivalents.

We claim:

1. A sealing device comprising:
   an anchoring portion made of a polymer plastics material and formed at a first end of the sealing device, the anchoring portion comprising:
   a flexible central portion extending from a first radial end of the anchoring portion to a second radial end distal the first radial end;
   an outer section extending from the second radial end of the central portion; and
   a rounded protuberance extending from an outer surface of the central portion,
   wherein the anchoring portion comprises a C shaped opening defined in part by the central portion and the outer flexible section,
   wherein the protuberance extends in a direction away from the C shaped opening;
   sealing portion made of the polymer plastics material formed at a second end of the sealing device distal to the first end of the sealing device and
   an intermediate portion comprising the polymer plastics material and connecting the first radial end of the central flexible portion of the anchoring portion and the sealing portion,
   wherein the polymer plastics material comprises a mixture of polybutylene terephthalate comprising at least in part polybutylene terephthalate, friction modifying filler, and glass microsphere fillers.

2. The sealing device of claim 1, wherein the sealing portion further comprises:
   a first non-contacting lip;
   a contacting lip configured to form a seal against a radially inner ring of a bearing unit; and
   a second non-contacting lip extending radially from a radial end distal to the first non-contacting lip,
   wherein the sealing portion comprises a C shaped opening defined in part by the first non-contacting lip and the contacting lip of the sealing portion.

3. The sealing device of claim 1, wherein a first outer diameter (SRD15) of the anchoring portion is related to a second outer diameter (SRD10) of the anchoring portion such that:

$$SRD15+0.3 \text{ mm} < SRD10 < SRD15+0.5 \text{ mm}.$$

4. The sealing device of claim 1, wherein an inner diameter (SRD20) of the flexible section of the anchoring portion defines a start of a groove of the flexible section and a thickness (SRL03) of the flexible section is at most 0.5 mm.

5. The sealing device of claim 1, wherein a thickness (SRL01) of the intermediate portion is between 0.5 mm and 0.9 mm.

6. A bearing unit comprising:
a radially outer ring;
a radially inner ring;
a plurality of rolling bodies interposed between the radially outer ring and the radially inner ring; and
a sealing device comprising:
a radially outer anchoring portion made of a single polymer plastics material and comprising:
a flexible central portion extending from a first radial end of the anchoring portion to a second radial end distal the first radial end;
an axially outer section extending axially from the second radial end of the central portion; and
a rounded protuberance extending from an axially inner surface of the central portion,
wherein the radially outer anchoring portion defines a C shaped opening,
wherein the protuberance is axially opposed to the C shaped opening;
an intermediate portion made of the single polymer plastics material; and
a radially inner sealing portion made of the single polymer plastics material and distal to the radially outer anchoring portion, wherein the polymer plastics material comprises a mixture of polybutylene terephthalate comprising at least in part polybutylene terephthalate, friction modifying filler, and glass microsphere fillers.

7. The bearing unit according to claim 6, wherein the sealing portion further comprises:
a first non-contacting lip;
a contacting lip that forms a seal against the radially inner ring of the bearing unit; and
a second non-contacting lip extending radially from a radial end distal to the first non-contacting lip.

8. The bearing unit according to claim 7, wherein a working diameter (SRD39) of the contacting lip is related to a corresponding working diameter (IRD84) of the radially inner ring such that:

$IRD84+0.2 \text{ mm} < SRD39 < IRD84+0.4 \text{ mm}$.

9. The bearing unit according to claim 6, wherein a first radially outer diameter (SRD15) of the anchoring geometry is related to a radially inner diameter (ORD43) of the radially inner groove of the radially outer ring such that:

$ORD43+0.2 \text{ mm} < SRD15 < ORD43+0.5 \text{ mm}$, and wherein a second radially outer diameter (SRD10) is related to the first radially outer diameter (SRD15) of the anchoring geometry such that:

$SRD15+0.3 \text{ mm} < SRD10 < SRD15+0.5 \text{ mm}$.

10. The bearing unit according to claim 6, wherein the at least one protuberance is positioned according to a diameter (SRD31) that is related to a radially inner diameter (ORD30) of the radially outer ring such that:

$ORD30+0.5 \text{ mm} < SRD31 < ORD30+0.8 \text{ mm}$.

11. The bearing unit according to claim 6, wherein a radially inner diameter (SRD20) of the flexible section defines a start of a groove of the flexible section and is related to a radially inner diameter (ORD30) of the radially outer ring such that:

$ORD30+0.2 \text{ mm} < SRD20 < ORD30+0.4 \text{ mm}$, and wherein an axial thickness (SRL03) of the flexible section is at most 0.5 mm.

12. The bearing unit according to claim 6, wherein an axial thickness (SRL01) of the intermediate portion is between 0.5 mm and 0.9 mm.

13. A sealing device comprising:
an anchoring portion made of a polymer plastics material and formed at a first end of the sealing device, the anchoring portion comprising:
a flexible central portion extending from a first radial end of the anchoring portion to a second radial end distal the first radial end;
an outer section extending from the second radial end of the central portion; and
a rounded protuberance extending from an outer surface of the central portion,
wherein, the anchoring portion comprises a C shaped opening defined in part by the central portion and the outer flexible section, and
the protuberance extends in a direction away from the C shaped opening;
a sealing portion made of the polymer plastics material formed at a second end of the sealing device distal to the first end of the sealing device, the sealing portion comprising:
a first non-contacting lip;
a contacting lip configured to form a seal against a radially inner ring of a bearing unit; and
a second non-contacting lip extending radially from a radial end distal to the first non-contacting lip,
wherein the sealing portion comprises a C shaped opening defined in part by the first non-contacting lip and the contacting lip of the sealing portion; and
an intermediate portion comprising the polymer plastics material and connecting first end of the central flexible portion of the anchoring portion and the sealing portion,
wherein,
the polymer plastics material comprises a mixture of polybutylene terephthalate comprising at least in part polybutylene terephthalate, friction modifying filler, and glass microsphere fillers,
a first outer diameter (SRD15) of the anchoring portion is related to a second outer diameter (SRD10) of the anchoring portion such that SRD15+0.3 mm<SRD10<SRD15+0.5 mm,
an inner diameter (SRD20) of the flexible section of the anchoring portion defines a start of a groove of the flexible section and a thickness (SRL03) of the flexible section is at most 0.5 mm, and
a thickness (SRL01) of the intermediate portion is between 0.5 mm and 0.9 mm.

* * * * *